US 11,238,858 B2

(12) United States Patent
Qian et al.

(10) Patent No.: US 11,238,858 B2
(45) Date of Patent: Feb. 1, 2022

(54) SPEECH INTERACTIVE METHOD AND DEVICE

(71) Applicant: BAIDU ONLINE NETWORK TECHNOLOGY (BEIJING) CO., LTD., Beijing (CN)

(72) Inventors: Kerning Qian, Beijing (CN); Qiusheng Xie, Beijing (CN); Yiwen Deng, Beijing (CN); Zhirong Xue, Beijing (CN); Dongdong Lei, Beijing (CN); Jinhui Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 142 days.

(21) Appl. No.: 16/418,633

(22) Filed: May 21, 2019

(65) Prior Publication Data

US 2019/0362720 A1 Nov. 28, 2019

(30) Foreign Application Priority Data

May 28, 2018 (CN) .......................... 201810523966.1

(51) Int. Cl.
*G06F 3/16* (2006.01)
*G10L 15/22* (2006.01)

(52) U.S. Cl.
CPC .............. *G10L 15/22* (2013.01); *G06F 3/167* (2013.01); *G10L 2015/223* (2013.01)

(58) Field of Classification Search
USPC ......... 704/1–9, 200–275; 706/11–25, 45–62; 725/9–21, 37–61
See application file for complete search history.

(56) References Cited

U.S. PATENT DOCUMENTS 8,719,039 B1* 5/2014 Sharifi .................... G10L 15/08
  704/275
10,720,159 B1* 7/2020 Sindhwani ........... G06Q 10/087
11,169,616 B2* 11/2021 Lemay .................... G06F 3/167
(Continued)

FOREIGN PATENT DOCUMENTS

CN 103188541 A 7/2013
CN 105575390 A 5/2016
(Continued)

OTHER PUBLICATIONS

Chinese Patent Application No. 201810523966.1 Office Action dated Aug. 25, 2021, 7 pages.
(Continued)

*Primary Examiner* — Marcellus J Augustin
(74) *Attorney, Agent, or Firm* — Lathrop GPM LLP (57) ABSTRACT

The present disclosure provides a speech interactive method and device. The method includes: during a process of displaying an interface of an application, detecting a first user operation; in response to the first user operation, querying a speech instruction associated with the application based on the application containing the interface and querying a system general speech instruction; setting the speech instruction and the system general speech instruction as applicable speech instructions for the application; and providing a prompt based on the applicable speech instructions to perform a speech interaction.

18 Claims, 5 Drawing Sheets (56) References Cited

U.S. PATENT DOCUMENTS

| | | | |
|---|---|---|---|
| 2009/0306980 A1* | 12/2009 | Shin | G06F 3/0488 |
| | | | 704/235 |
| 2017/0371885 A1* | 12/2017 | Aggarwal | G06F 3/167 |
| 2018/0278740 A1* | 9/2018 | Choi | H04M 1/72403 |
| 2018/0336904 A1* | 11/2018 | Piercy | G10L 15/22 |
| 2019/0096280 A1* | 3/2019 | Saunders | H04L 67/22 |
| 2019/0147862 A1* | 5/2019 | Lu | G06F 16/951 |
| | | | 704/251 |

FOREIGN PATENT DOCUMENTS

| | | |
|---|---|---|
| CN | 107608586 A | 1/2018 |
| CN | 107767864 A | 3/2018 |
| CN | 107833574 A | 3/2018 |
| CN | 107924288 A | 4/2018 |
| CN | 107945796 A | 4/2018 |
| CN | 108027738 A | 5/2018 |

OTHER PUBLICATIONS

Chinese Patent Application No. 201810523966.1 English translation of Office Action dated Aug. 25, 2021, 6 pages.

\* cited by examiner

Fig. 10

# SPEECH INTERACTIVE METHOD AND DEVICE

CROSS-REFERENCE TO RELATED APPLICATION

This application claims priority of Chinese Patent Application No. 201810523966.1, filed on May 28, 2018, the entire contents of which are incorporated herein by reference.

FIELD

The present disclosure relates to speech interactive technologies, and more particularly to a speech interactive method, and a speech interactive device.

BACKGROUND

With continuous development of artificial intelligence technologies and speech interactive technologies, a smart device, such as a smart robot, a terminal device is becoming more and more popular, and more and more users buy smart devices. By inputting a speech instruction, the smart device is controlled to implement predetermined functions.

In related art, during a process that a user inputs the speech instruction, or after the user uses a wake-up term to waken up the smart device, the smart device provides no speech prompt. Only after the user inputs the speech instruction, a related speech prompt is provided, such that the user may perform a speech interaction based on the related speech prompt.

In this way, the user needs to acquire and remember the speech prompt in advance, which means that a high user dependency is required. In addition, since there are a plurality of speech instructions, the probability that the user inputs a correct speech instruction is low, which may cause a failure of identifying the smart device, thus leading to uncontrolled situations.

DISCLOSURE

The present disclosure aims to solve at least one problem in the related art at least to some extent.

Accordingly, a first objective of the present disclosure is to provide a speech interactive method to ensure that a user may query applicable speech instructions for an application during a process of displaying an interface of the application, such that the user may perform a speech interaction based on the applicable speech instructions, thus reducing a probability of failing to realize speech recognition of a smart device. In addition, a prompt is provided based on the applicable speech instructions without depending on subjective cognition of the user. The user may be guided to be acquainted with the applicable speech instructions of the application containing a current interface, thus reducing strangeness. Further, the user may be guided to use new functions of the application, thus facilitating displaying and usage of deep-functions of the application.

A second objective of the present disclosure is to provide a speech interactive device.

A third objective of the present disclosure is to provide a computer device.

A fourth objective of the present disclosure is to provide a non-temporary computer-readable storage medium.

A fifth objective of the present disclosure is to provide a computer program product.

In order to achieve above objectives, a first aspect of embodiments of the present disclosure provides a speech interactive method, including: during a process of displaying an interface of an application, detecting a first user operation; in response to the first user operation, querying a speech instruction associated with the application based on the application containing the interface, and querying a system general speech instruction; setting the speech instruction associated with the application and the system general speech instruction as applicable speech instructions for the application; and providing a prompt based on the applicable speech instructions to perform a speech interaction.

With the speech interactive method according to embodiments of the present disclosure, the first user operation is detected during the process of displaying the interface of the application, and in response to the first user operation, the speech instruction associated with the application is queried based on the application containing the interface and the system general speech instruction is queried, the speech instruction associated with the application and the system general speech instruction are set as the applicable speech instructions, and the prompt is provided based on the applicable speech instructions to perform the speech interaction. In this disclosure, the user may query the applicable speech instructions for the application in real time during the process of displaying the interface of the application, such that the user may perform the speech interaction based on the applicable speech instructions, thus reducing a probability of failing to realize speech recognition of a smart device. In addition, a prompt is provided based on the applicable speech instructions without depending on subjective cognition of the user. The user may be guided to be acquainted with the applicable speech instructions for the application containing a current interface, thus reducing strangeness. Further, the user may be guided to use new functions of the application, thus facilitating displaying and usage of deep-functions of the application.

In order to achieve the above objectives, a second aspect of embodiments of the present disclosure provides a speech interactive device including: a detecting module, configured to, during a process of displaying an interface of an application, detect a first user operation; a querying module, configured to, in response to the first user operation, query a speech instruction associated with the application based on the application containing the interface, and query a system general speech instruction; a processing module, configured to set the speech instruction associated with the application and the system general speech instruction as applicable speech instructions for the application; and a prompting module, configured to provide a prompt based on the applicable speech instructions to perform a speech interaction.

With the speech interactive device according to embodiments of the present disclosure, the first user operation is detected during the process of displaying the interface of the application, and in response to the first user operation, the speech instruction associated with the application is queried based on the application containing the interface and the system general speech instruction is queried, the speech instruction associated with the application and the system general speech instruction are set as the applicable speech instructions, and the prompt is provided based on the applicable speech instructions to perform the speech interaction. In this disclosure, the user may query the applicable speech instructions for the application in real time during the process of displaying the interface of the application, such that the user may perform the speech interaction based on the applicable speech instructions, thus reducing a probability of failing to realize speech recognition of a smart device. In addition, a prompt is provided based on the applicable speech instructions without depending on subjective cognition of the user. The user may be guided to be acquainted with the applicable speech instructions for the application containing a current interface, thus reducing strangeness. Further, the user may be guided to use new functions of the application, thus facilitating displaying and usage of deep-functions of the application.

In order to achieve the above objectives, a third aspect of embodiments of the present disclosure provides a computer device including a memory, a processor and a computer program stored on the memory and executable by the processor. When the processor executes the computer program, the speech interactive method according to the first aspect of embodiments of the present disclosure is performed.

In order to achieve the above objectives, a fourth aspect of embodiments of the present disclosure provides a non-temporary computer-readable storage medium, having a computer program stored thereon. When the computer program is executed by a processor, the speech interactive method according to the first aspect of embodiments of the present disclosure is performed.

In order to achieve the above objectives, a fifth aspect of embodiments of the present disclosure provides a computer program product. When instructions in the computer program product are executed by a processor, the speech interactive method according to the first aspect of embodiments of the present disclosure is performed.

These and other aspects and advantages of embodiments of the present disclosure will be provided in following descriptions, and a part of them will become apparent from the following descriptions or will be understood by practice of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

EMBODIMENTS OF THE PRESENT DISCLOSURE

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The present disclosure provides a speech interactive method, in order to solve the problem in the related art that a speech interactive function of a smart device requires a high user dependency.

With the speech interactive method according to embodiments of the present disclosure, the first user operation is detected during the process of displaying the interface of the application, and in response to the first user operation, the speech instruction associated with the application is queried based on the application containing the interface and the system general speech instruction is queried, the speech instruction associated with the application and the system general speech instruction are set as the applicable speech instructions, and the prompt is provided based on the applicable speech instructions to perform the speech interaction. In this disclosure, the user may query the applicable speech instructions for the application in real time during the process of displaying the interface of the application, such that the user may perform the speech interaction based on the applicable speech instructions, thus reducing a probability of failing to realize speech recognition of a smart device. In addition, a prompt is provided based on the applicable speech instructions without depending on subjective cognition of the user. The user may be guided to be acquainted with the applicable speech instructions for the application containing a current interface, thus reducing strangeness. Further, the user may be guided to use new functions of the application, thus facilitating displaying and usage of deep-functions of the application.

The speech interactive method and device according to embodiments of the present disclosure will be described with reference to accompanying drawings.

Figure 1:
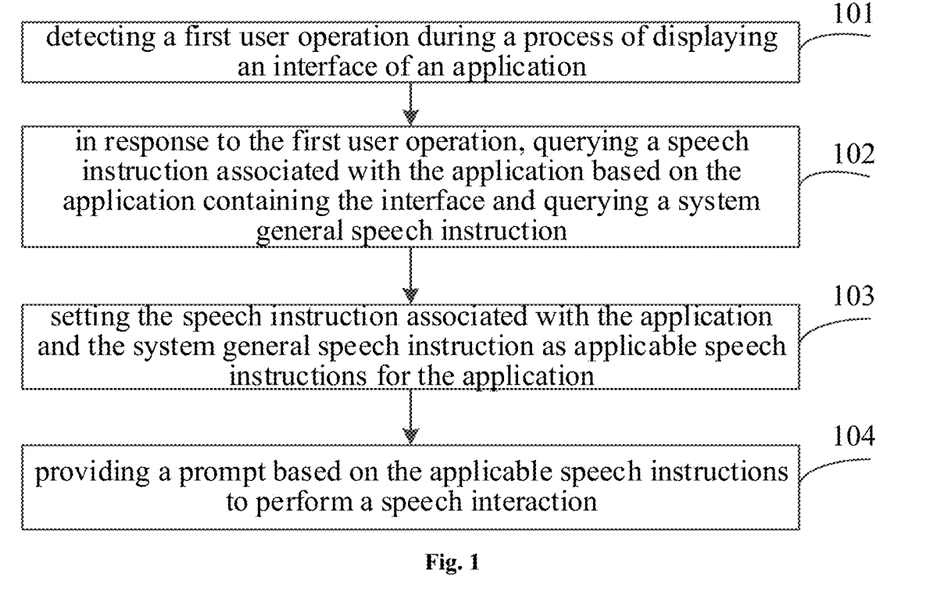
FIG. 1 is a flow chart of a speech interactive method according to a first embodiment of the present disclosure.

FIG. 1 is a flow chart of a speech interactive method according to an embodiment of the present disclosure.

The speech interactive method provided in the embodiment of the present disclosure may be implemented by the speech interactive device provided in the present disclosure. The speech interactive device may be included in a smart device, such that the smart device may implement a speech interactive function.

The smart device may be any of devices, apparatuses and machines having computing and processing capabilities, for example, the smart device may be a smart robot, or other device (such as a terminal device), which is not limited herein. The terminal device may be a hardware device having respective operating system, a touch screen and/or display, such as a phone, a tablet PC, a personal digital assistant, a wearable device.

As illustrated in FIG. 1, the speech interactive method may include the following.

At block 101, a first user operation is detected during a process of displaying an interface of an application.

In the embodiment, the application may refer to a software application which may be executable on the terminal device and provide any service for a user. For example, the application may be a navigation application, a search application, an entertainment application, a photo application or the like.

In the embodiment, the first user operation is triggered by the user. The first user operation may be, for example, an operation of the user triggering a speech input widget. In detail, the interface of the application may include the speech input widget. The user may trigger the speech input widget to generate first user operation, for example, the user may click the speech input widget to generate the first user operation.

In detail, a monitor may be provided in the smart device. During the process of displaying the interface of the application, the monitor is used to monitor the first user operation. When the first user operation is monitored, the step at block 102 may be triggered. When the first user operation is not monitored, the step at block 101 is executed again, until the first user operation is monitored and the step at block 102 is triggered.

At block 102, in response to the first user operation, a speech instruction associated with the application is queried based on the application containing the interface and a system general speech instruction is queried.

At block 103, the speech instruction associated with the application and the system general speech instruction are set as applicable speech instructions for the application.

In the embodiment, each application has a speech instruction associated therewith. For example, for the search application, such as a browser, when the user opens the browser, the user may have a requirement of opening a predetermined link, such that the speech instruction associated with the browser may be: opening the predetermined link, accessing the predetermined link, opening a favorite, opening history log and so on. For another example, for the environment application, such as a music player, when the user opens the music player, the user may have a requirement of listening music, such that the speech instruction associated with the music player may be: playing a predetermined song, playing the predetermined song in a continuous loop, downloading the predetermined song, checking a recommended list and so on.

The system general speech instruction may be a speech instruction applicable to various applications. For example, the system general speech instruction may be: opening a predetermined application, closing the predetermined application, exiting the predetermined application and so on.

In the embodiment, when the first user operation is detected, in response to the first user operation, the speech interactive device may query the speech instruction associated with the application based on the application containing the interface, query the system general speech instruction, and set the speech instruction associated with the application and the system general speech instruction as the applicable speech instructions for the application.

It should be understood that for different interfaces belonging to different applications, the speech instructions associated with the different applications are different, such that the applicable speech instructions for the different applications are different. For example, when the interface belongs to a browser, the applicable speech instructions for the browser may be: opening a predetermined link, accessing the predetermined link, opening a favorite, opening history log, closing the browser, exiting the browser and so on. When the interface belongs to a music player, the applicable speech instructions for the music player may be: playing a predetermined song, playing the predetermined song in a continuous loop, downloading the predetermined song, checking a recommended list, playing a music video of the predetermined song, closing the music player, exiting the music player and so on.

At block 104, a prompt is provided based on the applicable speech instructions to perform a speech interaction.

In the embodiment, after determining the applicable speech instructions for the application containing the interface, the prompt can be provided based on the applicable speech instructions to perform the speech interaction. In this way, the user may query the applicable speech instructions for the application in real time during the process of displaying the interface of the application, such that the user may perform the speech interaction based on the applicable speech instructions.

As a possible implementation, in order to ensure the user to query the applicable speech instructions in real time, the applicable speech instructions may be displayed in text form on the interface, such that the user may generate corresponding speech instruction based on the text displayed on the interface to perform the speech interaction.

Of course, the applicable speech instructions may be broadcasted in speech form, such that the user may generate corresponding speech instruction based on the content broadcasted by the smart device to perform the speech interaction.

Figure 2:
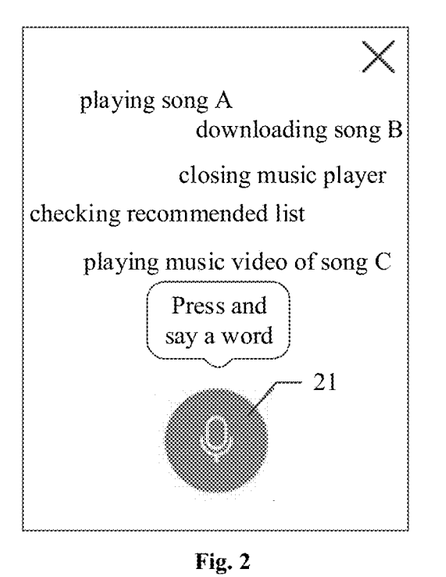
FIG. 2 is a schematic diagram of a speech input interface according to an embodiment of the present disclosure.

As an application scenario, in the case that the application is the music player, after the user triggers the speech input button on the interface of the music player, the speech input interface illustrated in FIG. 2 can be displayed. The applicable speech instructions for the music player may be displayed in text form on the speech input interface, such that the user may trigger the speech input button 21 and generate corresponding speech instruction based on the displayed text to perform the speech interaction.

With the speech interactive method according to embodiments of the present disclosure, the first user operation is detected during the process of displaying the interface of the application, and in response to the first user operation, the speech instruction associated with the application is queried based on the application containing the interface and the system general speech instruction is queried, the speech instruction associated with the application and the system general speech instruction are set as the applicable speech instructions, and the prompt is provided based on the applicable speech instructions to perform the speech interaction. In this disclosure, the user may query the applicable speech instructions for the application in real time during the process of displaying the interface of the application, such that the user may perform the speech interaction based on the applicable speech instructions, thus reducing a probability of failing to realize speech recognition of a smart device. In addition, a prompt is provided based on the applicable speech instructions without depending on subjective cognition of the user. The user may be guided to be acquainted with the applicable speech instructions for the application containing a current interface, thus reducing strangeness. Further, the user may be guided to use new functions of the application, thus facilitating displaying and usage of deep-functions of the application.

Figure 3:
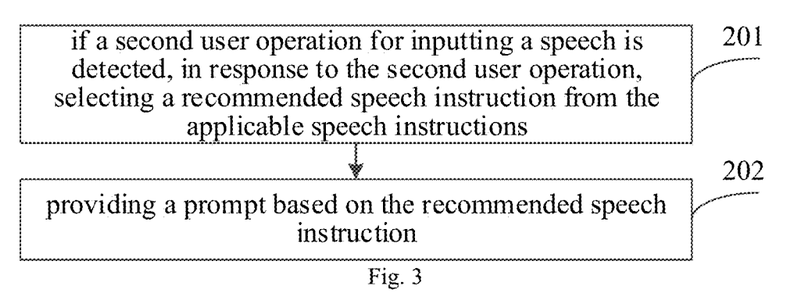
FIG. 3 is a flow chart of a speech interactive method according to a second embodiment of the present disclosure.

As a possible implementation, in order to ensure that the related speech prompt may be provided when the user input a speech, in the present disclosure, with reference to FIG. 3, based on the embodiment illustrated in FIG. 1, after the step at block 103, the speech interactive method further includes the following.

At block 201, if a second user operation for inputting a speech is detected, in response to the second user operation, a recommended speech instruction is selected from the applicable speech instructions.

In the embodiment, the second user operation is triggered by the user. The second user operation may be, for example, an operation of the user triggering the speech input widget.

In detail, the user may trigger the speech input widget to generate the second user operation, for example, the user may press the speech input widget for a long time to generate the second user operation. The second user operation may be an operation of the user inputting a wake-up term in speech. In detail, the smart device may be provided with a module for collecting the user speech, the user may use the module to input the wake-up term, so as to generate the second user operation, which is not limited herein.

In detail, the second user operation may be monitored by a monitor provided in the smart device. When it is monitored that the user triggers the second user operation for inputting the speech, for example, the user presses the speech input widget for a long time, or the user inputs the wake-up term in speech, the recommended speech instruction can be selected from the applicable speech instructions.

As a possible implementation, a usage counter of each applicable speech instruction may be queried. Based on the usage counter, the recommended speech instruction may be selected from the applicable speech instructions. For example, the applicable speech instruction having the usage counter greater than a predetermined threshold can be set as the recommended speech instruction. The applicable speech instructions may be sequenced according to the usage counter from largest to smallest, and a preset number of applicable speech instructions may be selected as the recommended speech instructions. In this way, often-used speech instructions may be prompted to the user, such that the targeted prompt can be provided to the user, thus improving the speech interactive experience of the user.

The predetermined threshold and the preset number can be set by an installed application of the smart device in advance, or may be set by the user, which is not limited herein.

As another possible implementation, a software update version for each newly added applicable speech instruction may be queried, and the latest applicable speech instruction is selected from the applicable speech instructions as the recommended speech instruction based on the software update version. In this way, the user may be guided to user new functions of the application, thus facilitating displaying and usage of deep-functions of the application.

For example, when the interface belongs to a game application, assuming that a game role in the latest version of the game application newly adds a certain weapon, in order to enable the user to know the newly added weapon, the recommended speech instructions may be: displaying the newly added weapon, adding the weapon and so on.

At block 202, a prompt is provided based on the recommended speech instruction.

In the embodiment, after determining the recommended speech instruction, the prompt can be provided based on the recommended speech instruction.

As a possible implementation, in order to enable the user to query the recommended speech instruction in real time, the recommended speech instruction may be displayed in text form on the interface, such that the user may generate corresponding speech instruction based on the text displayed on the interface, to perform the speech interaction.

Of course, the recommended speech instruction may be broadcasted in speech, such that the user may generate corresponding speech instruction based on the content broadcasted by the smart device, to perform the speech interaction.

As a possible implementation, before selecting the latest applicable speech instruction as the recommended speech instruction, the latest applicable speech instruction may be determined according to a version number of each software update version, and the prompt is provided when a number of occurrences of providing the prompt to select the latest applicable speech instruction as the recommended speech instruction is no greater than a predetermined number.

The predetermined number may be set by an installed application of the smart device, or may be set by the user, for example, the predetermined number may be 3.

It should be understood that when the number of occurrences of providing the prompt to select the latest applicable speech instruction as the recommended speech instruction is greater than the predetermined number, a situation that the user remembers the recommended speech instruction may occur, in this case, it is meaningless to provide the recommended speech instruction to the user since the user has no interest in the recommended speech instruction. Thus, in the embodiment, it may be determined whether the number of occurrences of providing the prompt to select the latest applicable speech instruction as the recommended speech instruction is greater than the predetermined number, if yes, the prompt to select the latest applicable instruction as the recommended speech instruction is not provided, if no, the prompt to select the latest applicable instruction as the recommended speech instruction is provided.

Figure 4:
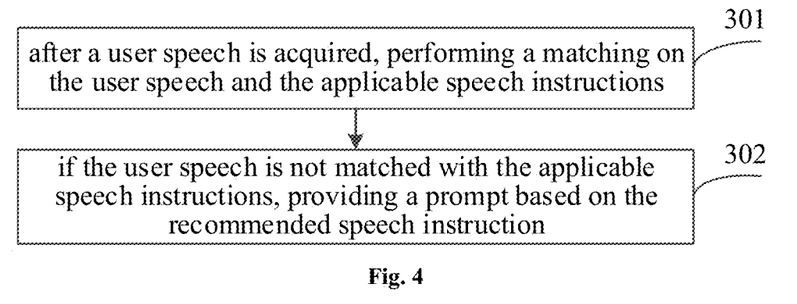
FIG. 4 is a flow chart of a speech interactive method according to a third embodiment of the present disclosure.

As a possible implementation, in order to improve a possibility that the user successfully inputs the applicable speech instruction, in the present disclosure, with reference to FIG. 4, based on the embodiment illustrated in FIG. 3, the speech interactive method may further include the following.

At block 301, after a user speech is acquired, a matching is performed on the user speech and the applicable speech instructions.

In the embodiment, after the user speech is acquired, the matching is performed on the user speech and the applicable speech instructions. For example, by analyzing the user speech, various syllables of the user speech may be acquired. Then, the various syllables are compared to respective syllables of the applicable speech instructions, to determine whether the user speech is matched with the applicable speech instructions.

A pre-trained acoustic model may be used to recolonize the user speech, to acquire various syllables. In detail, a large amount of speech data may be acquired in advance as training samples, and then various syllables in the training samples are labeled. The labeled training samples are used to train the acoustic model. After determining the user speech, the user speech is inputted to the trained acoustic model to acquire various syllables of the user speech.

At block 302, if the user speech is not matched with the applicable speech instructions, a prompt is provided based on the recommended speech instruction.

In the embodiment, if the user speech is not matched with the applicable speech instructions, the prompt is provided based on the recommended speech instruction, such that the user may be guided to re-generate corresponding speech instruction based on the prompt, to perform the speech interaction. If the user speech is matched with the applicable speech instructions, an interface displayed after the smart device performs the applicable speech instructions and speech instructions related to the current interface are displayed. For example, the applicable speech instructions may be: playing song A, in this case, the song A may be played and information on song A is displayed on the interface.

In the embodiment, after the user speech is acquired, the matching is performed on the user speech and the applicable speech instructions, if the user speech is not matched with the applicable speech instructions, the prompt is provided based on the recommended speech instruction. In this way, a probability that the user inputs the applicable speech instructions may be improved, such that a success rate of recognizing by the smart device the user speech is improved.

Figure 5:
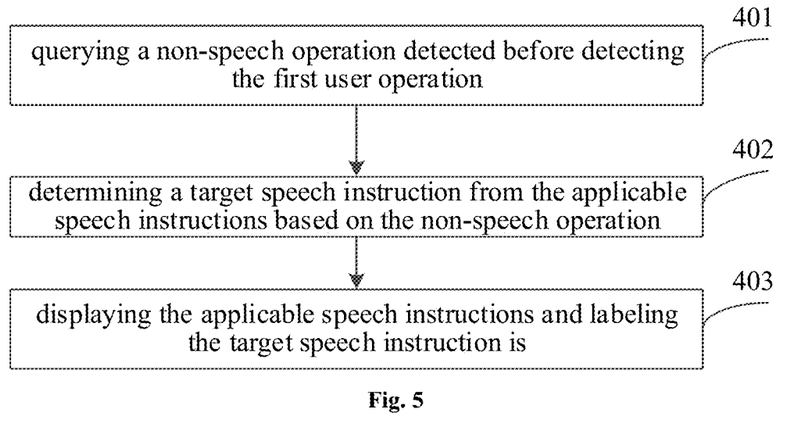
FIG. 5 is a flow chart of a speech interactive method according to a fourth embodiment of the present disclosure.

As a possible implementation, with reference to FIG. 5, based on embodiments illustrated in FIGS. 1-4, providing the prompt based on the applicable speech instructions may include the following.

At block 401, a non-speech operation detected before detecting the first user operation is queried.

In the embodiment, the non-speech operation is triggered by the user. The non-speech operation may be a touching operation, a button pressing operation, or the like. For example, the non-speech operation may be: the user activating a predetermined application, closing the predetermined application, exiting the predetermined application, manually clicking a predetermined function in the predetermined application and so on.

In the embodiment, it is determined whether the non-speech operation triggered by the user is detected before detecting the first user operation, if yes, the step at block 402 is executed.

At block 402, a target speech instruction is determined from the applicable speech instructions based on the non-speech operation.

In the embodiment, when the speech interactive device detects the non-speech operation triggered by the user, the target speech instruction may be determined from the applicable speech instructions based on the non-speech operation.

For example, when the non-speech operation is an operation of the user manually activating application A, then the target speech instruction can be determined as an instruction of opening application A in the system general speech instructions.

At block 403, the applicable speech instructions are displayed and the target speech instruction is labeled.

In the embodiment, after determining the target speech instruction corresponding to the non-speech operation, the applicable speech instructions may be displayed and the target speech instruction is labeled. In this way, after the user performs the touching operation or the button pressing operation, the target speech instruction is prompted to the user, such that the user may replace the touching operation or button pressing operation with the target speech instruction, thus improving user experience.

Figure 6:
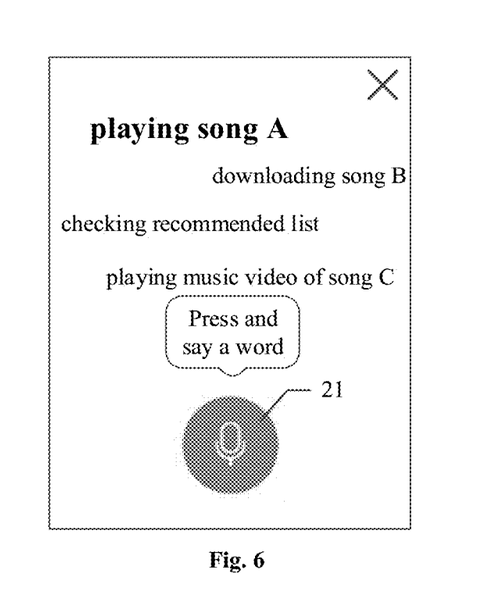
FIG. 6 is a schematic diagram of a speech input interface according to another embodiment of the present disclosure.

As an example, with reference to FIG. 6, when the non-speech operation is an operation of the user clicking and playing song A, then the target speech instruction may be determined as an instruction of playing song A in the speech instruction associated with the application based on the non-speech instruction, and the instruction "playing song A" displayed on the interface is labeled, for example, the instruction "playing song A" is enlarged and displayed in bold or the font of the instruction "playing song A" is changed to realize a high-lighting display of the instruction. After the user performs the touching operation or button pressing operation, the speech instruction that the user can perform is prompted, such that the user may replace the target speech instruction with the touching operation or button pressing operation, thus improving user experience.

Figure 7:
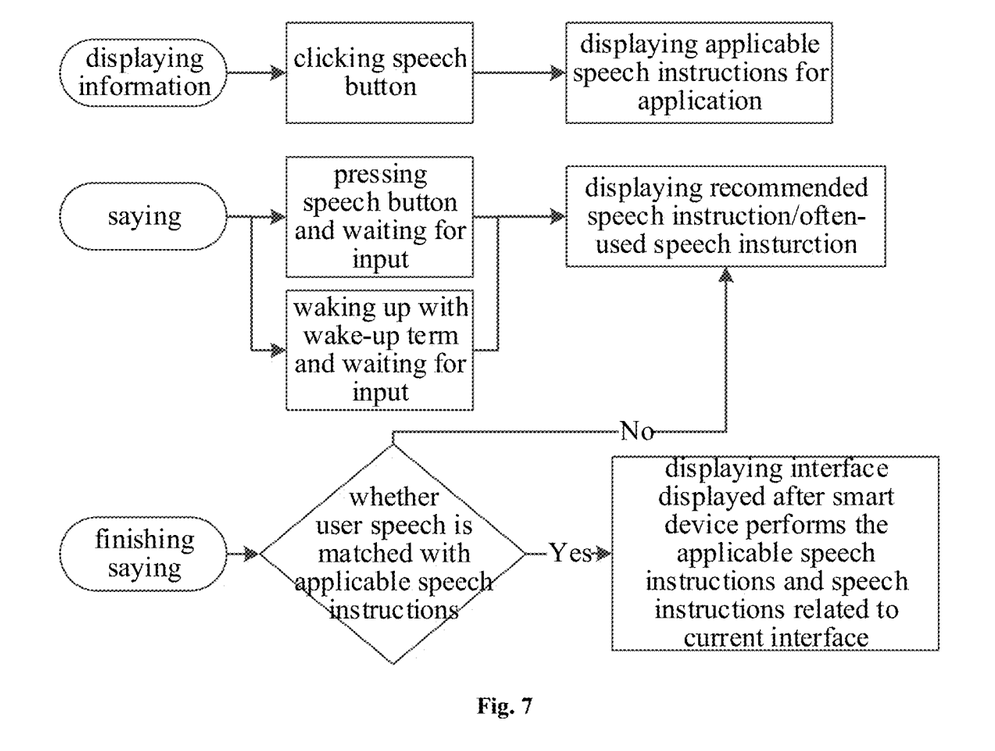
FIG. 7 is a schematic diagram of an application scenarios according to an embodiment of the present disclosure.

As an application scenario, with reference to FIG. 7, FIG. 7 is a schematic diagram of the application scenario according to an embodiment of the present disclosure. When the user clicks the speech input widget (speech button) in any application, the applicable speech instructions for the application can be displayed on the interface, such that the user may query the applicable speech instructions for the application in real time and perform the speech interaction based on the applicable speech instructions, thus reducing the probability of failing to realize speech recognition of the smart device.

When the user presses the speech button for a long time such that a speech is to be inputted, or when the user inputs a wake-up term in speech, the recommended speech instruction/often-used speech instruction may be displayed on the interface, such that a targeted prompt can be provided to the user, thus improving the speech interactive experience of the user.

When the user finishes inputting the speech, a matching is performed on the user speech and the applicable speech instructions. If the user speech is not matched with the applicable speech instructions, the recommended speech instruction/often-used speech instruction may be displayed on the interface. If the user speech is matched with the applicable speech instructions, the interface displayed after the smart device performs the speech instruction and speech instructions related to the current interface may be displayed.

In order to implement the above embodiments, the present disclosure further provides a speech interactive device.

Figure 8:
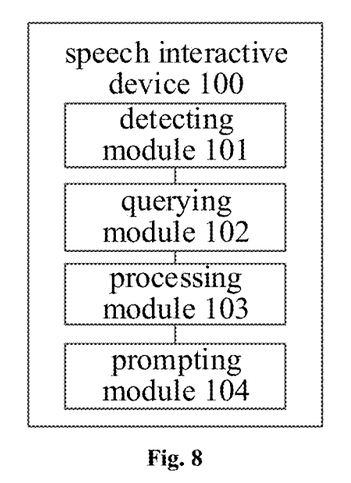
FIG. 8 is a block diagram of a speech interactive device according to a fifth embodiment of the present disclosure.

FIG. 8 is a block diagram of a speech interactive device according to a fifth embodiment of the present disclosure.

As illustrated in FIG. 8, the speech interactive device 100 includes a detecting module 101, a querying module 102, a processing module 103 and a prompting module 104.

The detecting module 101 is configured to detect a first user operation during a process of displaying an interface of an application.

The querying module 102 is configured to, in response to the first user operation, query a speech instruction associated with the application based on the application containing the interface and query a system general speech instruction.

The processing module 103 is configured to set the speech instruction associated with the application and the system general speech instruction as applicable speech instructions for the application.

The prompting module 104 is configured to provide a prompt based on the applicable speech instructions to perform a speech interaction.

Figure 9:
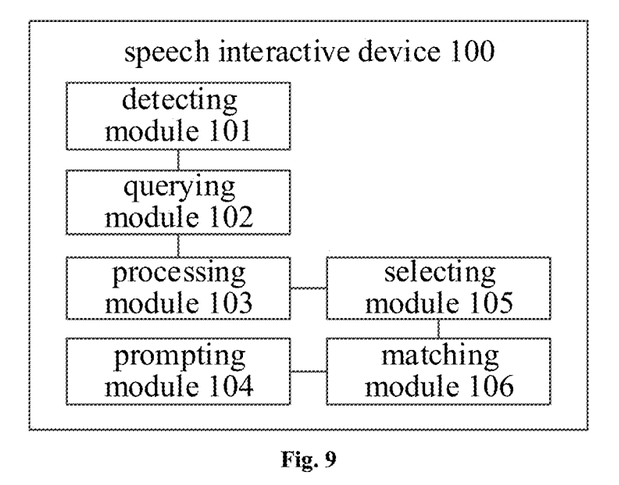
FIG. 9 is a block diagram of a speech interactive device according to a sixth embodiment of the present disclosure.

Further, in a possible implementation of embodiments of the present disclosure, with reference to FIG. 9, based on the embodiment illustrated in FIG. 8, the speech interactive device may further include a selecting module 105 and a matching module 106.

The selecting module 105 is configured to, after the speech instruction associated with the application and the system general speech instruction are set as the applicable speech instructions for the application, if a second user operation for inputting a speech is detected, in response to the second user operation, a recommended speech instruction is selected from the applicable speech instructions.

As a possible implementation, the selecting module 105 is further configured to query a usage counter of each applicable speech instruction and select the recommended speech instruction from the applicable speech instructions based on the usage counter.

As another possible implementation, the selecting module 105 is further configured to query a software update version of each newly added applicable speech instruction and select a latest applicable speech instruction from the applicable speech instructions based on the software update version as a recommended speech instruction.

Alternatively, the selecting module 105 is further configured to, before the latest applicable speech instruction is selected from the applicable speech instructions based on the software update version as the recommended speech instruction, determine the latest applicable speech instruction based on a version number of the software update version and provide the prompt when a number of occurrences of providing the prompt to select the latest applicable speech instruction as the recommended speech instruction is no greater than a predetermined number.

The prompting module 104 is further configured to providing the prompt based on the recommended speech instruction.

The matching module 106 is configured to match a user speech with the applicable speech instructions after the user speech is acquired.

The prompting module 104 is further configured to provide the prompt based on the recommended speech instruction when the user speech is not matched with the application speech instructions.

As a possible implementation, the prompting module 104 is further configured to query a non-speech operation detected before detecting the first user operation, determine a target speech instruction from the applicable speech instructions based on the non-speech operation, display the applicable speech instructions and label the target speech instruction.

It should be noted that the description of embodiments of the speech interactive method is also applicable to the speech interactive device 100 of the present embodiment, which is not elaborated herein.

With the speech interactive device according to embodiments of the present disclosure, the first user operation is detected during the process of displaying the interface of the application, and in response to the first user operation, the speech instruction associated with the application is queried based on the application containing the interface and the system general speech instruction is queried, the speech instruction associated with the application and the system general speech instruction are set as the applicable speech instructions, and the prompt is provided based on the applicable speech instructions to perform the speech interaction. In this disclosure, the user may query the applicable speech instructions for the application in real time during the process of displaying the interface of the application, such that the user may perform the speech interaction based on the applicable speech instructions, thus reducing a probability of failing to realize speech recognition of a smart device. In addition, a prompt is provided based on the applicable speech instructions without depending on subjective cognition of the user. The user may be guided to be acquainted with the applicable speech instructions for the application containing a current interface, thus reducing strangeness. Further, the user may be guided to use new functions of the application, thus facilitating displaying and usage of deep-functions of the application.

In order to achieve the above embodiments, the present disclosure further provides a computer device, including a memory, a processor and a computer program stored on the memory and executable on the processor. When the computer program is executed by the processor, the speech interactive method provided in the above-mentioned embodiments of the present disclosure is performed.

In order to achieve the above embodiments, the present disclosure further provides a non-temporary computer-readable storage medium, having a computer program stored thereon. When the computer program is executed by a processor, the speech interactive method provided in the above-mentioned embodiments of the present disclosure is performed.

In order to achieve the above embodiments, the present disclosure further provides a computer program product. When instructions in the computer program product are executed by a processor, the speech interactive method provided in the above-mentioned embodiments of the present disclosure is performed.

Figure 10:
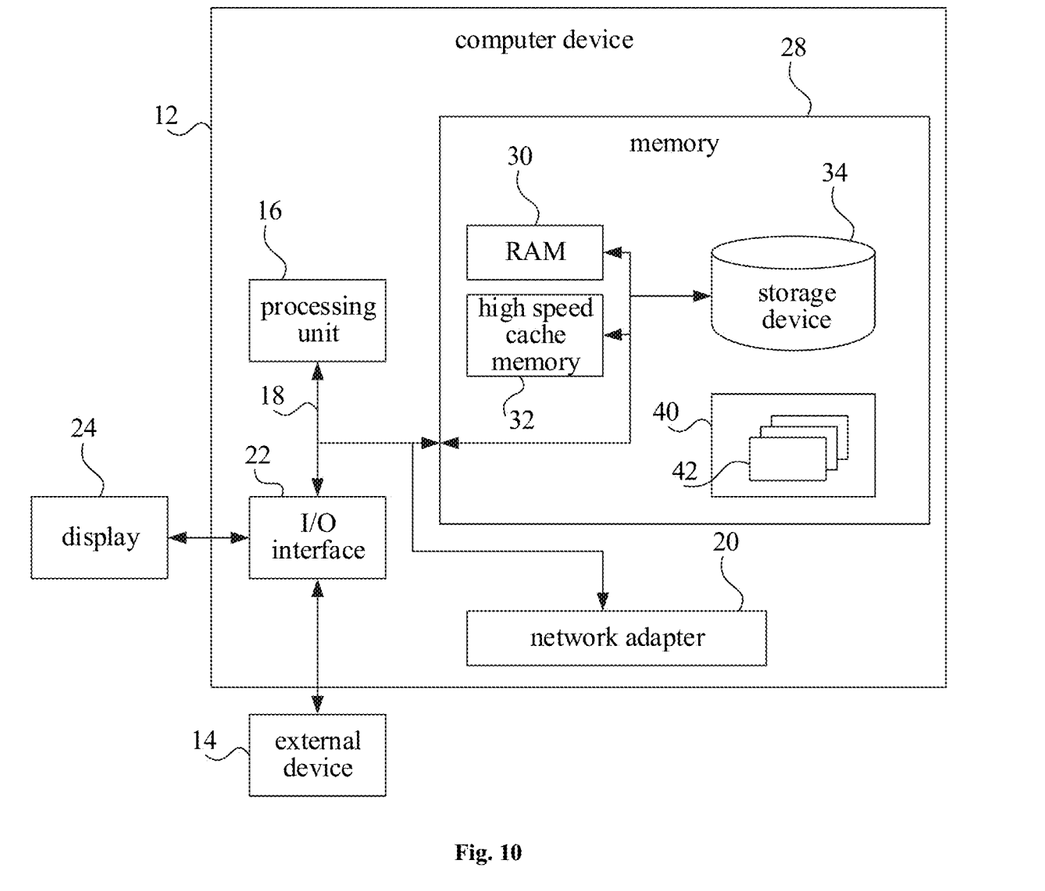
FIG. 10 is a block diagram of a computer device applicable to implement an embodiment of the present disclosure.

FIG. 10 is a block diagram of a computer device applicable to implement embodiments of the present disclosure. The computer device 12 illustrated in FIG. 10 is merely an example, and cannot be interpreted as a limitation on the function and application scope of the embodiments of the present disclosure.

As illustrated in FIG. 10, the computer device 12 is represented by a general computer device. Components of the computer device 12 may include, but is not limited to, one or more processors or processing units 16, a system memory 28, a bus 18 connected to various system components, such as the system memory 28, the processor 16.

The bus 18 represents one or more of any of several types of bus structures, including a memory bus or a memory controller, a peripheral bus, an accelerated graphics port, a processor 16, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The computer device 12 may further include other removable or non-removable, volatile or non-volatile computer system storage media. By way of example only, the storage device 34 may be configured to read and write a non-removable and non-volatile magnetic media (not shown in FIG. 10, commonly referred to as a "hard drive"). Although not shown in FIG. 10, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As shown in FIG. 10, the network adapter 20 communicates with other modules of the computer device 12 over the bus 18. It should be understood that, although not shown in FIG. 10, other hardware and/or software modules may be used in conjunction with the computer device 12. The hardware and/or software includes, but is not limited to, microcode, device drivers, redundant processing units, external disk drive arrays, RAID systems, tape drive and data backup storage system.

The processing unit 16 is configured to execute various functional applications and data processing by running programs stored in the system memory 28, for example, implementing the voiceprint registration method provided in embodiments of the present disclosure.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A speech interactive method, comprising:
during a process of displaying an interface of an application, detecting a first user operation, wherein the first user operation is an operation for triggering a speech input widget;
in response to the first user operation, querying a speech instruction associated with the application based on the application containing the interface, and querying a system general speech instruction;
setting the speech instruction associated with the application and the system general speech instruction as applicable speech instructions for the application;
providing a prompt based on the applicable speech instructions;
wherein providing the prompt based on the applicable speech instructions comprises:
querying a non-speech operation detected before detecting the first user operation;
determining a target speech instruction from the applicable speech instructions based on the non-speech operation, wherein the non-speech operation can be replaced with the target speech instruction; and
displaying the applicable speech instructions and highlighting the target speech instruction to prompt the user to use the target speech instruction to replace the non-speech operation.

2. The method of claim 1, wherein, after setting the speech instruction associated with the application and the system general speech instruction as the applicable speech instructions for the application, the method further comprises:
when detecting a second user operation for inputting a speech, in response to the second user operation, selecting a recommended speech instruction from the applicable speech instructions; and
providing the prompt based on the recommended speech instruction.

3. The method of claim 2, wherein, selecting the recommended speech instruction from the applicable speech instructions comprises:
querying a usage counter of each applicable speech instruction; and
selecting the recommended speech instruction from the applicable speech instructions based on the usage counter.

4. The method of claim 2, wherein, selecting the recommended speech instruction from the applicable speech instructions comprises:
querying a software update version for each newly added applicable speech instruction; and
selecting a latest applicable speech instruction from the applicable speech instructions as the recommended speech instruction based on the software update version.

5. The method of claim 4, wherein, before selecting the latest applicable speech instruction from the applicable speech instructions as the recommended speech instruction based on the software update version, the method further comprises:
determining the latest applicable speech instruction based on a version number of the software update version; and
providing the prompt when a number of occurrences of providing the prompt to select the latest applicable speech instruction as the recommended speech instruction is no greater than a predetermined threshold.

6. The method of claim 2, wherein the method further comprises:
matching a user speech with the applicable speech instructions after the user speech is acquired; and
when the user speech does not match with the applicable speech instructions, providing the prompt based on the recommended speech instruction.

7. A computer device, comprising a memory, a processor and a computer program stored on the memory and executable by the processor, wherein when the processor executes the computer program, the processor is caused to perform operations comprising:
during a process of displaying an interface of an application, detecting a first user operation, wherein the first user operation is an operation for triggering a speech input widget;
in response to the first user operation, querying a speech instruction associated with the application based on the application containing the interface, and querying a system general speech instruction;
setting the speech instruction associated with the application and the system general speech instruction as applicable speech instructions for the application;
providing a prompt based on the applicable speech instructions;
wherein providing the prompt based on the applicable speech instructions comprises:
querying a non-speech operation detected before detecting the first user operation;
determining a target speech instruction from the applicable speech instructions based on the non-speech operation, wherein the non-speech operation can be replaced with the target speech instruction; and
displaying the applicable speech instructions and highlighting the target speech instruction to prompt the user to use the target speech instruction to replace the non-speech operation.

8. The computer device of claim 7, wherein, after setting the speech instruction associated with the application and the system general speech instruction as the applicable speech instructions for the application, the processor is caused to further perform operations comprising:
when detecting a second user operation for inputting a speech, in response to the second user operation, selecting a recommended speech instruction from the applicable speech instructions; and
providing the prompt based on the recommended speech instruction.

9. The computer device of claim 8, wherein, selecting the recommended speech instruction from the applicable speech instructions comprises:
querying a usage counter of each applicable speech instruction; and
selecting the recommended speech instruction from the applicable speech instructions based on the usage counter.

10. The computer device of claim 8, wherein, selecting the recommended speech instruction from the applicable speech instructions comprises:
querying a software update version for each newly added applicable speech instruction; and
selecting a latest applicable speech instruction from the applicable speech instructions as the recommended speech instruction based on the software update version.

11. The computer device of claim 10, wherein, before selecting the latest applicable speech instruction from the applicable speech instructions as the recommended speech instruction based on the software update version, the processor is caused to further perform operations comprising:

determining the latest applicable speech instruction based on a version number of the software update version; and     providing the prompt when a number of occurrences of providing the prompt to select the latest applicable speech instruction as the recommended speech instruction is no greater than a predetermined threshold.

12. The computer device of claim 8, wherein the processor is caused to further perform operations comprising:

matching a user speech with the applicable speech instructions after the user speech is acquired; and     when the user speech does not match with the applicable speech instructions, providing the prompt based on the recommended speech instruction.

13. A non-temporary computer-readable storage medium, having a computer program stored thereon, wherein when the computer program is executed by a processor, the processor is caused to perform operations comprising:

during a process of displaying an interface of an application, detecting a first user operation, wherein the first user operation is an operation for triggering a speech input widget;

in response to the first user operation, querying a speech instruction associated with the application based on the application containing the interface, and querying a system general speech instruction;

setting the speech instruction associated with the application and the system general speech instruction as applicable speech instructions for the application;

providing a prompt based on the applicable speech instructions;

wherein providing the prompt based on the applicable speech instructions comprises:

querying a non-speech operation detected before detecting the first user operation;

determining a target speech instruction from the applicable speech instructions based on the non-speech operation, wherein the non-speech operation can be replaced with the target speech instruction; and     displaying the applicable speech instructions and highlighting the target speech instruction to prompt the user to use the target speech instruction to replace the non-speech operation.

14. The non-temporary computer-readable storage medium of claim 13, wherein, after setting the speech instruction associated with the application and the system general speech instruction as the applicable speech instructions for the application, the processor is caused to further perform operations comprising:

when detecting a second user operation for inputting a speech, in response to the second user operation, selecting a recommended speech instruction from the applicable speech instructions; and     providing the prompt based on the recommended speech instruction.

15. The non-temporary computer-readable storage medium of claim 14, wherein, selecting the recommended speech instruction from the applicable speech instructions comprises:

querying a usage counter of each applicable speech instruction; and     selecting the recommended speech instruction from the applicable speech instructions based on the usage counter.

16. The non-temporary computer-readable storage medium of claim 14, wherein, selecting the recommended speech instruction from the applicable speech instructions comprises:

querying a software update version for each newly added applicable speech instruction; and     selecting a latest applicable speech instruction from the applicable speech instructions as the recommended speech instruction based on the software update version.

17. The non-temporary computer-readable storage medium of claim 16, wherein, before selecting the latest applicable speech instruction from the applicable speech instructions as the recommended speech instruction based on the software update version, the processor is caused to further perform operations comprising:

determining the latest applicable speech instruction based on a version number of the software update version; and     providing the prompt when a number of occurrences of providing the prompt to select the latest applicable speech instruction as the recommended speech instruction is no greater than a predetermined threshold.

18. The non-temporary computer-readable storage medium of claim 14, wherein the processor is caused to further perform operations comprising:

matching a user speech with the applicable speech instructions after the user speech is acquired; and     when the user speech does not match with the applicable speech instructions, providing the prompt based on the recommended speech instruction.

\* \* \* \* \*